United States Patent [19]

Sakurai

[11] 4,420,781
[45] Dec. 13, 1983

[54] MAGNETIC HEAD WITH AN AMORPHOUS HALL ELEMENT

[75] Inventor: Yoshifumi Sakurai, Minoo, Japan

[73] Assignee: Olympus Optical Co., Ltd., Tokyo, Japan

[21] Appl. No.: 276,458

[22] Filed: Jun. 23, 1981

[30] Foreign Application Priority Data

Jul. 7, 1980 [JP] Japan .................................. 55-92481

[51] Int. Cl.³ ........................... G11B 5/38; G11B 5/22
[52] U.S. Cl. .................................... 360/112; 360/122
[58] Field of Search ............... 360/110, 112, 113, 122, 360/123, 124, 125, 126, 114, 127; 324/45, 46

[56] References Cited

U.S. PATENT DOCUMENTS

| | | |
|---|---|---|
| 3,114,009 | 12/1963 | Camras et al. |
| 3,715,522 | 2/1973 | Tsukagoshi .......................... 360/112 |
| 3,943,570 | 3/1976 | Yamamoto .......................... 360/112 |
| 4,155,106 | 5/1979 | Muraoka ............................ 360/112 |
| 4,179,719 | 12/1979 | Imamura ............................ 360/112 |

OTHER PUBLICATIONS

IBM Technical Disclosure Bulletin, vol. 17, No. 12, May, 1975, "Pseudo-Hall Head Designs", G. Bate et al., pp. 3761-3764.

*Primary Examiner*—Robert Martin Kilgore
*Attorney, Agent, or Firm*—Frishauf, Holtz, Goodman and Woodward

[57] ABSTRACT

Disclosed is a magnetic head comprising a support member having a plane faced by a magnetic recording medium; an electromagnetic converter mounted on the support member, and provided with an amorphous magnetic film which is possessed of an axis of easy magnetization extending in a prescribed direction along the plane of the film.

The amorphous magnetic film occupies such a position on the support member that a magnetic flux sent forth from the recording medium passes through the amorphous magnetic film in the prescribed direction.

22 Claims, 11 Drawing Figures

F I G. 8
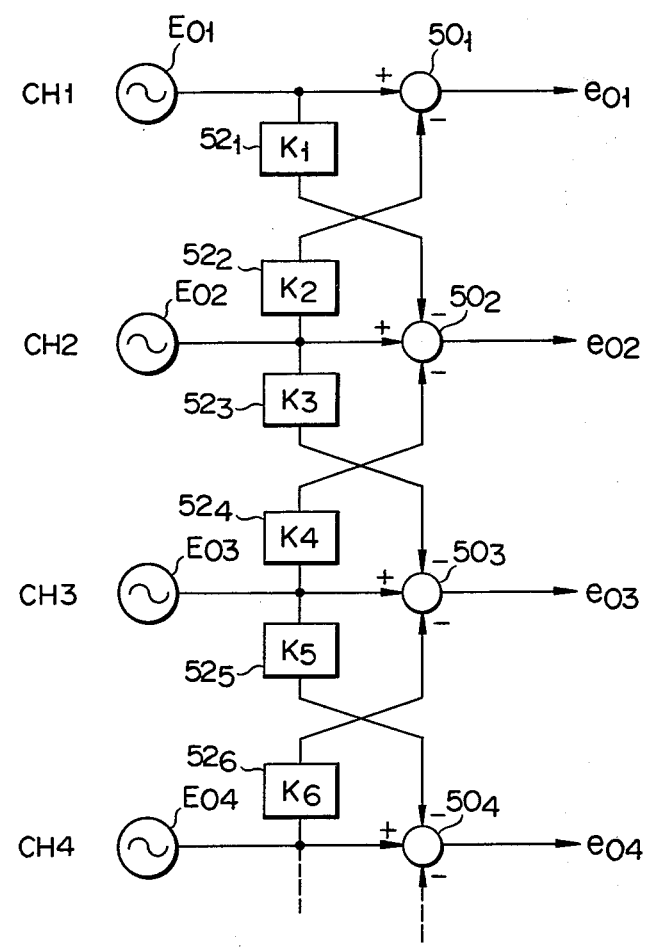

MAGNETIC HEAD WITH AN AMORPHOUS HALL ELEMENT

BACKGROUND OF THE INVENTION

This invention relates to a magnetic head utilizing the Hall effect of a thin film of amorphous alloy.

In recent years active studies have been made of a magnetic head utilizing a thin film of amorphous alloy formed of transition metal and rare earth metal. Such a magnetic head is already set forth in Japanese patent disclosure No. 52-131,711. This disclosed magnetic head comprises an amorphous magnetic film having an axis of easy magnetization directed perpendicularly to a film plane, and attains a desired effect by utilizing the memory property of said film and its anomalous Hall effect.

With the disclosed magnetic head, a Hall voltage is produced, as set forth in FIGS. 3 and 4 of the patent disclosure, by causing the plane of the amorphous magnetic film to contact that of a magnetic tape 5 or to face it. Unless, therefore, the width of the film 2 as measured from the running direction of the magnetic tape 5 is narrower than the width of a unit magnetized region stored in the magnetic tape 5, then it is impossible to correctly draw out data (Hall voltage) corresponding to the unit magnetized region. In other words, the disclosed magnetic head substantially fails to reproduce data having a shorter wavelength than the width of the film 2, and is not adapted for reproduction of data recorded with high density by a vertical magnetic recording system. (For the vertical magnetic recording system, refer to, for example, the Japanese patent disclosure No. 52-134,706).

The inventor of this patent application has conducted studies on a magnetic head suitable for the reproduction of data recorded with high density by the vertical magnetic recording system. As a result, the inventor has discovered that where a Hall element having an axis of easy magnetization extending in the planar direction of the film is applied instead of utilizing vertical magnetic anisotropy, then it is possible to provide a magnetic head adapted for reproduction of data recorded with high density (hereinafter referred to as "high density data").

SUMMARY OF THE INVENTION

This invention has been accomplished from the above-mentioned discovery and is intended to provide a magnetic head suitable for the reproduction of high density data.

With a magnetic head embodying this invention, therefore, a magnetic film having an axis of easy magnetization extending in the planar direction of said film is used as electromagnetic conversion means, and a magnetic flux corresponding to the data to be reproduced is caused to flow in the planar direction of the magnetic film. This arrangement has the advantages that the magnetic anisotropy of the magnetic film can be utilized, and the thickness of the magnetic film can be made to match a magnetic head gap, thereby providing an extremely narrow effective gap width; and data can be reproduced with extremely high resolution from a recording medium in which data is recorded by the vertical magnetic recording system or any other high density recording process.

An amorphous magnetic film formed of a mixture or compound of rare earth elements and transition metals represented typically by gadolinium cobalt (Gd Co) and gadolinium iron (Gd Fe) has a high magnetic/electric conversion efficiency due to an anomalous Hall effect, and is free from current noises originating with the boundary regions of a polycrystal. Therefore, the above-mentioned amorphous magnetic film is disposed on the front gap side as magnetic/electric conversion means, then high sensitivity and high S/N ratio are assured, even if the magnetic head gap is narrowed, that is, the amorphous magnetic film is rendered thin in order to realize high resolution. Further with the magnetic head of this invention, signals of a plurality of channels can be detected by a single thin film Hall element. In this case, bias current supplied to the amorphous magnetic film is applied in common to all the channels. Therefore, the magnetic head of this invention has fewer external terminals than the conventional multichannel Hall magnetic head having the same number of channels. Consequently, it is possible to manufacture a multichannel magnetic head having a small interchannel gap in quantities at low cost.

BRIEF DESCRIPTION OF THE DRAWINGS

FIG. 8 shows a circuit arrangement of means for electrically cancelling interchannel crosstalk.

DETAILED DESCRIPTION OF THE PREFERRED EMBODIMENTS

Description is now given with reference to the accompanying drawings of a magnetic head embodying this invention. Throughout the drawings, common or similar parts are denoted by the same or similar numerals briefness of description. In other words, the parts of all the drawings indicated by common numerals are exchangable for each other.

Figure 1:
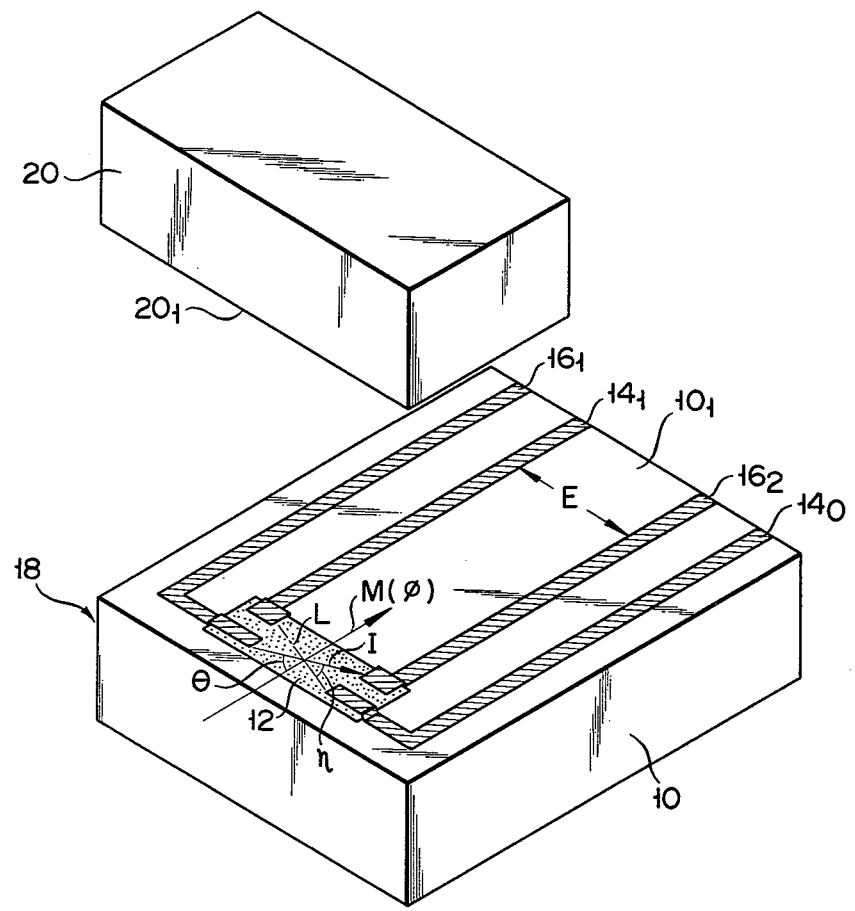
FIG. 1 is an oblique view of the construction of a magnetic head embodying this invention.

A magnetic head embodying this invention is constructed as shown in FIG. 1. The upper surface $10_1$ of an insulation substrate 10 is grounded to provide an optically flat plane. The material used for substrate 10 may be a glass, ceramics or the like. An amorphous magnetic film 12 (hereinafter referred to as "the film") is mounted on a prescribed position of the surface $10_1$ of said substrate 10, for example, by already generally applied thermal deposition or sputtering. After deposited, the film 12 is photetched into a prescribed pattern as shown in FIG. 1. After the film 12 is deposited, voltage terminal patterns $14_0$, $14_1$ and current terminal patterns $16_1$, $16_2$ are formed on said film 12. The formation of these terminal patterns may be carried out by thermal deposition or sputtering a layer of aluminium or copper. Thereafter, said terminal patterns are photoetched into a prescribed from. The foregoing steps completes a first half 18 of a magnetic head block.

The film 12 may be an alloy of, for example, rare earth elements and transition metals such as gadolinium cobalt (Gd Co) and gadolinium iron (Gd Fe). An amorphous magnetic alloy such as Gd Co indicates not only the effect of a normal Hall effect as observed in a semiconductor Hall element (electromagnetic converter) such as indium antimony (In Sb), but also an anomalous Hall effect depending on magnetization M or magnetic dipole density. The film 12 is free from current noises originating with the boundary regions of a polycrystal. Even when, therefore, rendered extremely thin, a Hall element made of the film 12 produces a high Hall output voltage and is little contaminated by noises, assuring a high S/N ratio. For example, with the Gd Co composition of the film 12 used as a Hall element, Gd is generally preferred to account for about 15 to 40 atm %. Obviously, this preferred composition varies with an ambient temperature or any other condition in which the captioned magnetic head is used.

With the magnetic head of this invention, the film 12 should have magnetic anisotropy in the planar direction. In other words, the film 12 is required to have an axis of easy magnetization in a prescribed direction indicated by an arrow M along the plane $10_1$ of the insulation substrate 10. Such film 12 displays a planar Hall effect. Now let it be assumed that the direction in which bias current I runs through the current terminal patterns $16_1$, $16_2$ defins an angle $\theta$ with the direction M in which the film 12 is magnetized. Then, the voltage terminal patterns $14_0$, $14_1$ are impressed with a Hall voltage proportional to $\sin 2\theta$. In this case, the Hall voltage is generated most prominently in a direction perpendicular to the running direction of the bias current I. Therefore, the current terminal patterns $16_1$, $16_2$ are so deposited on the film 12 that the aforementioned angle $\theta$ as much approximates 45° as possible. Further, the voltage terminal patterns $14_0$, $14_1$ are so formed on the film 12 that an angle $\eta$ defined by a straight line L connecting together were voltage terminal patterns $14_0$, $14_1$ with the running direction of the bias current I indicates approximately 90°.

The film 12 having a planar magnetic anisotropy can be produced by any of the following processes.

(1) An amorphous magnetic film 12 formed of, for example, Gd Co often indicates vertical magnetic anisotropy when formed with a greater thickness than about 0.2 to 1.0 microns. Conversely, formed with a smaller thickness than a certain level, the film 12 indicates planar magnetic anisotropy. For instance, a Gd Co film experimentally formed with a thickness of about 0.15 micron indicated planar magnetic anisotropy. In other words, when produced with a smaller thickness than a film showing vertical magnetic anisotropy, the film 12 indicates planar magnetic anisotropy. With a multichannel magnetic head set forth in the Japanese patent application Ser. No. 55-4303 filed by the same assignee as that of the present patent application, an amorphous magnetic film of Gd Co containing 10 to 40 atm % of Gd and having a thickness of 0.2 to 1.0 micron indicated vertical magnetic anisotropy. With the process described above, the film 12 should be considerably thinned in order to provide planar magnetic anisotropy. When the film 12 is extremely thinned, bias current supplied thereto increases in density. Since, however, the film 12 is amorphous, the S/N ratio is little deteriorated. The thinning of the film 12 is advantageous for elevation of resolution.

(2) The film 12 is formed, for example, by a vacuum evaporator applying an electron-beam-heating type evaporation source. When formed by such vacuum evaporation with a small thickness, the film 12, of for example, Gd Co often indicates plnar magnetic anisotropy. The process of (2) assures the relatively easy formation of the film 12.

(3) The film 12 is formed in such a manner that the particles of, for example, Gd Co to be mounted on the substrate 10 by thermal deposition, vacuum deposition or sputtering are introduced in a direction defining a prescribed angle (for example, about 60°) with the normal of the substrate 10.

With any of the above-mentioned three processes, the substrate 10 may be rotated to assure the uniform deposition of the film 12. Most preferred is the joint application of all the above-described three processes, namely, the method of preparing the film 12 from, for example, Gd Co by oblique thermal deposition with a thickness of 0.15 micron. Obviously, the three processes need not be applied jointly. The reason is that depending on the condition of deposition, the film 12 sometimes indicates planar magnetic anisotropy even when formed with a greater thickness than 0.2 micron. At present, the direction in which magnetic anisotropy appears on the plane of the film 12 cannot be indicated other than experimentally determined. Therefore it is necessary to form the film 12 for trial under a prescribed condition, recognize the direction in which planar magnetic anisotropy appears on the plane of the film 12 by the cut and try process, and finally produce a required film in which planar magnetic anisotropy runs in the direction M of magnetization indicated in FIG. 1. Once the film-forming condition defined, the direction in which the planar magnetic anisotropy is produced is always fixed.

Figure 2:
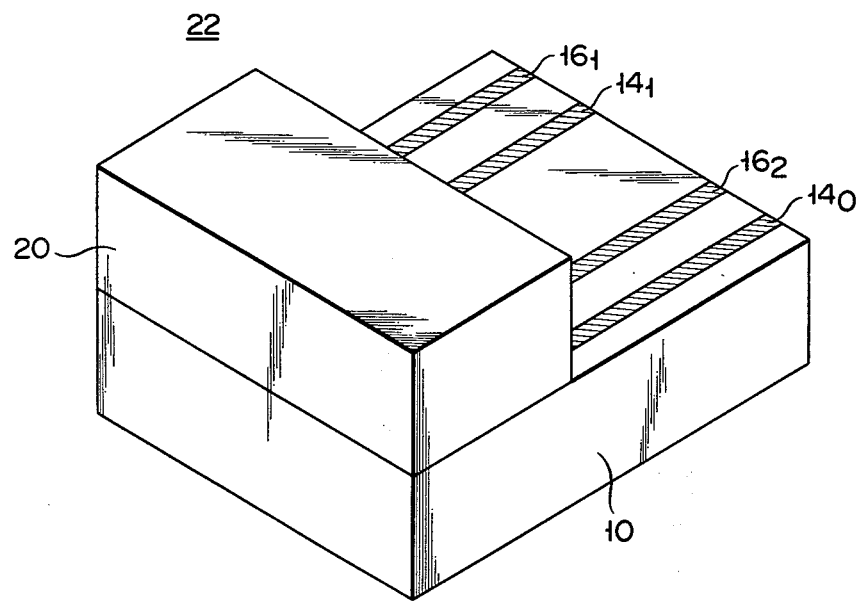
FIG. 2 is an oblique view of a head block constructed by assembling two head halves.

A second half 20 of the magnetic head block is tightly bonded to the aforementioned first half 18 thereof. The underside $20_1$ of the second magnetic head half 20 which is positioned opposite to the upper surface $10_1$ of the first magnetic head half 18 is flatly ground. Both magnetic head halves 18, 20 are bonded together by low melting glass or organic adhesive. The magnetic head half 20 may be formed of the same material as the substrate 10. FIG. 2 shows a magnetic head block 22 constructed by completely bonding both magentic head halves 18, 20.

Figure 3:
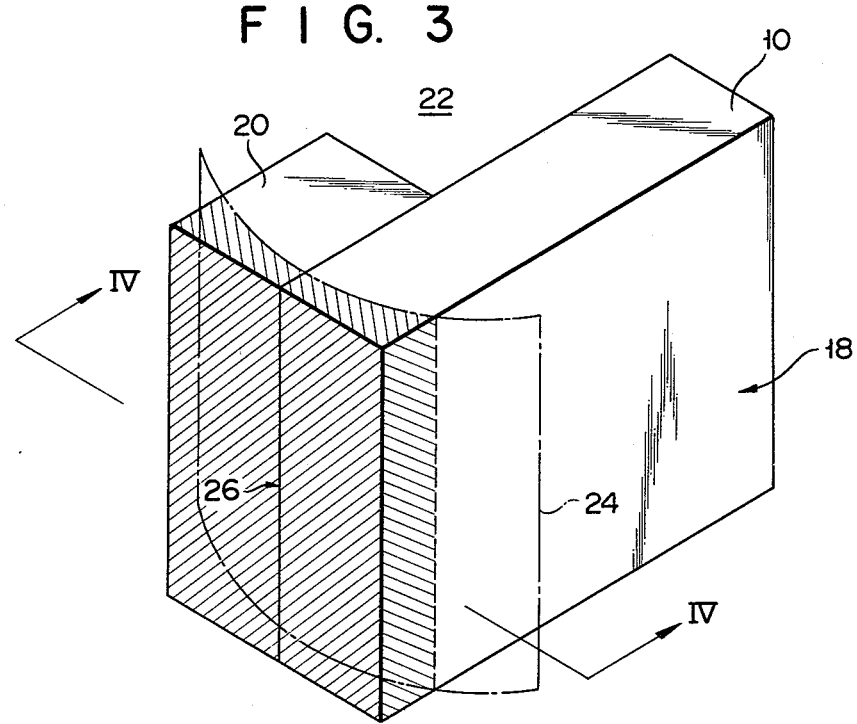
FIG. 3 is an oblique view showing the process of grinding in the arcuate form that plane of the head block which is contacted by a sliding tape.

As illustrated in FIG. 3, that portion 24 (a hatching) of the magnetic head block 22 which is contacted by a sliding recording medium, for example, a magnetic tape is arcuately gound off. The magnetic head gap is formed at the junction 26 of the substrate 10 and second magnetic head half 20.

The present invention is particularly adopted for reproducing information recorded by the "vertical magnetic recording system." Hereinafter explanation will be given only to the reproduction of information vertically magnetized in a magnetic tape, for brevity. In a vertical magnetic recording system a magnetic layer is magnetized in a direction perpendicular to the plane thereof. The vertically magnetized information in a magnetic layer is free from a self-demagnetization, thus this system enabling a high density recording to be effected.

Figure 4:
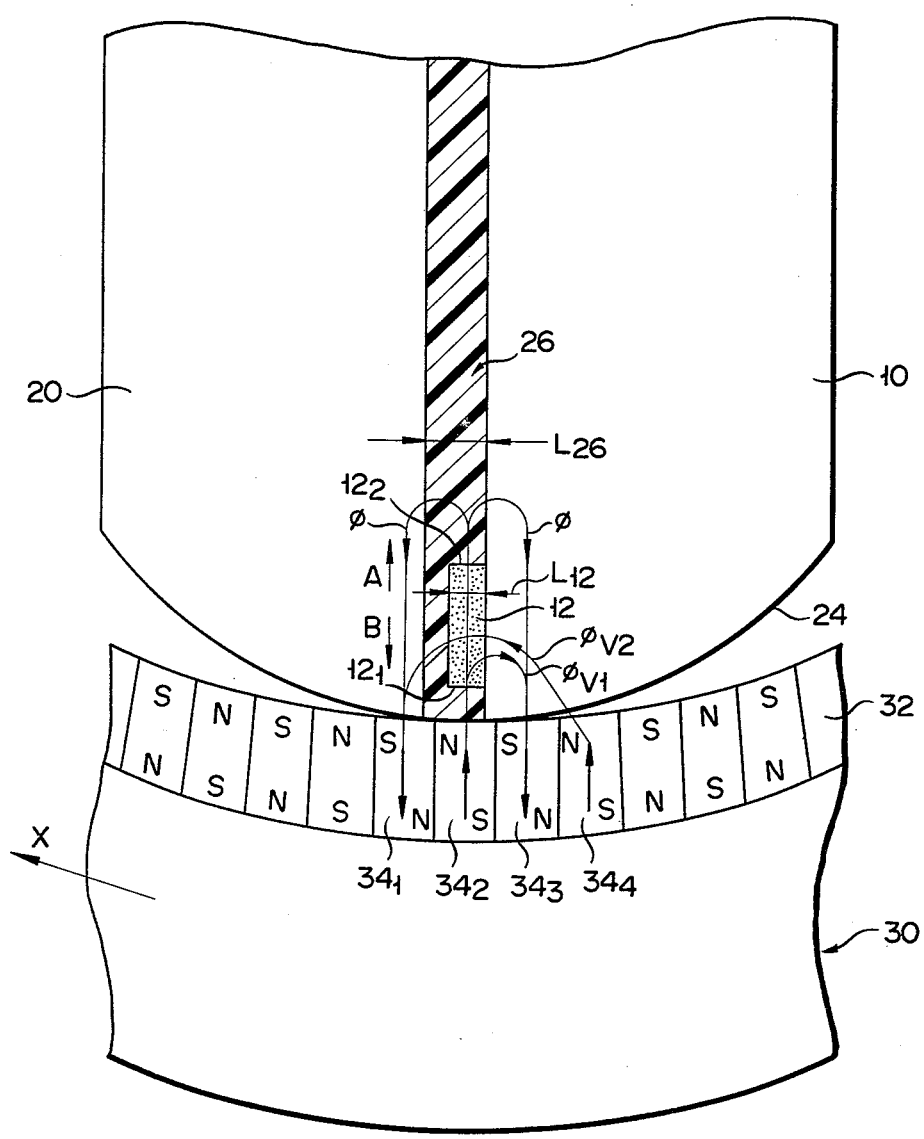
FIG. 4 is a sectional view on line IV—IV of FIG. 3, illustrating the streams of magnetic fluxes emitted from the magnetized patterns recorded in a magnetic tape.

FIG. 4 is a sectional view on line IV—IV of FIG. 3. For better understanding, the junction 26 and film 12 are indicated in enlargement. Formed in a magnetic layer 32 of a magnetic tape are a large number of unit magnetized regions 34, in which every adjacent magnetization direction (the arrangement of S and N) is reversed from each other. When the lateral edge $12_1$ of the film 12 is positioned immediately above the unit magnetized region $34_2$, then a magnetic flux $\phi$ sent forth from said region $34_2$ runs in the direction of an indicated arrow A along the axis of easy magnetization of the film 12 and returns to the unit magnetized regions $34_1$, $34_3$. When the lateral edge $12_1$ of the film 12 is brought immediately above the unit magnetized region $34_3$, then a magentic flux $\phi$ emitted from said region $34_3$ flows in the direction of an indicated arrow B along the axis of easy magnetization of the film 12 and runs into the unit magnetized regions $34_2$, $34_4$. Now let it be assumed that where the magnetic flux $\phi$ runs in the direction of the arrow A, then the voltage terminal pattern $14_1$ of FIG. 1 is impressed with positive Hall voltage (the pattern $14_0$ is considered as a potential reference). In this case, if the magnetic flux $\phi$ is conducted in the direction of the arrow B, then the voltage terminal pattern $14_1$ is impressed with negative Hall voltage. Thus, the film 12 can detect data stored in the extremely small unit magnetized regions $34_1$ to $34_4$.

The film 12 can detect the magnetized condition of the unit magnetized region 34 having a width larger than the thickness of the film 12 (generally less than 0.2 micron), providing a magnetic head having an extremely high resolution power. In other words, the film 12 having planar magnetic anisotropy can be made extremely thin and enables the width of an effective magnetic head gap to be narrowed. When the film 12 having vertical magnetic anisotropy is applied, the thickness of a bonding layer expands the junction 26 and thus the width of an effective magnetic head gap is widened.

An amorphous magnetic film prepared from, for example, Gd Co is free from boundary regions of a polycrystal and has an anomalous Hall effect, and, consequently, indicates a good S/N ratio, even if the film is formed with a thickness of the order of 0.1 micron (several thousand Å units). Therefore, the above-mentioned Gd Co film enables a magnetic head to be produced with a high resolution power and S/N ratio. The technique of producing an extremely thin film in now established. In FIG. 4, the lateral edge $12_1$ of the film 12 is slightly set apart from the surface of the magnetic layer 32. When, however, the wear of the magnetic head used may not be taken into consideration, then it is possible to generate higher Hall voltage by contacting said lateral edge $12_1$ of the film 12 with the magnetic layer 32.

Figure 5:
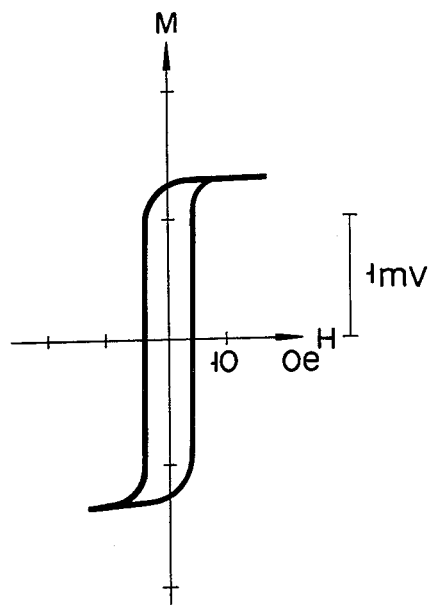
FIG. 5 indicates an example hysteresis characteristic of an amorphous magnetic film used with the magnetic head of FIG. 4.

FIG. 5 shows the hysteresis characteristic of an amorphous magnetic film of Gd Co which is formed of 23 atm % of Gd and 77 atm % of Co and indicates planar magnetic anisotropy. The hysteresis varies with the materials of an amorphous alloy film, its composition, the ambient temperature, and other factors. When used for reproduction of analog signals, the film is preferred to be the type little subject to the loss of hysteresis. When used for reproduction of digital signals, the film is desired to indicate rectangular hysteresis. A magnetic head used for reproduction of analog signals is detailed in the Japanese patent application Ser. No. 54-137,263 corresponding to patent application, Ser. No. 192,394, filed in the United States of America on Oct. 9, 1980, by the same assignee as that of the present application. A magnetic head used for reproduction of digital signals is detailed in the Japanese patent application 54-137,264 corresponding to patent application, Ser. No. 195,935, filed in the United States of America on Oct. 9, 1980 filed by the same assignee as that of the present application. These patent applications relate to a magnetic head comprising an amorphous magnetic film possessed of vertical magnetic anisotropy. The property of the above-mentioned type of magnetic film varies with the composition of the film and the ambient temperature at which the film is put to practical application as disclosed in the said Japanese patent applications.

Figure 6:
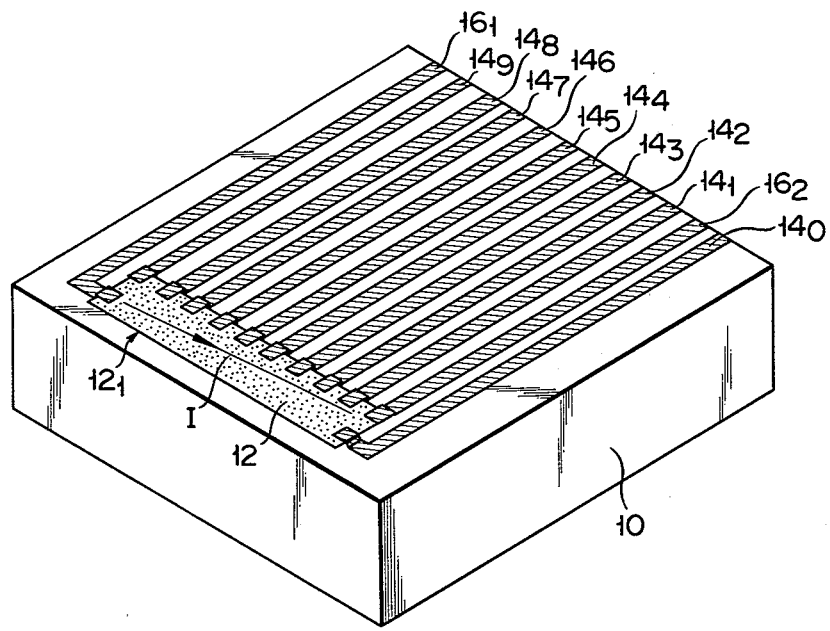
FIG. 6 is an oblique view of the arrangement of a multichannel magnetic head which is one application of a magnetic head shown in FIGS. 1 to 4.

FIG. 6 shows the arrangement of a multichannel magnetic head corresponding to a magnetic head shown in FIGS. 1 to 4. The amorphous magnetic film 12 of FIG. 1 may be separately provided for each channel. In FIG. 6, however, a single film 12 is used to provide a 9-channel magnetic head. In this case, bias current I may be used in common to all channels. It is sufficient to use each one of the voltage terminal patterns $14_1$ to $14_9$ per channel. The voltage terminal pattern $14_0$ is used in common to all the channels. With the arrangement of FIG. 6, the interchannel space can be more easily reduced and the number of the terminal patterns can be more decreased, and, consequently, a magnetic head can be manufactured with far greater ease than when a Hall element is separately provided for each channel.

Figure 7:
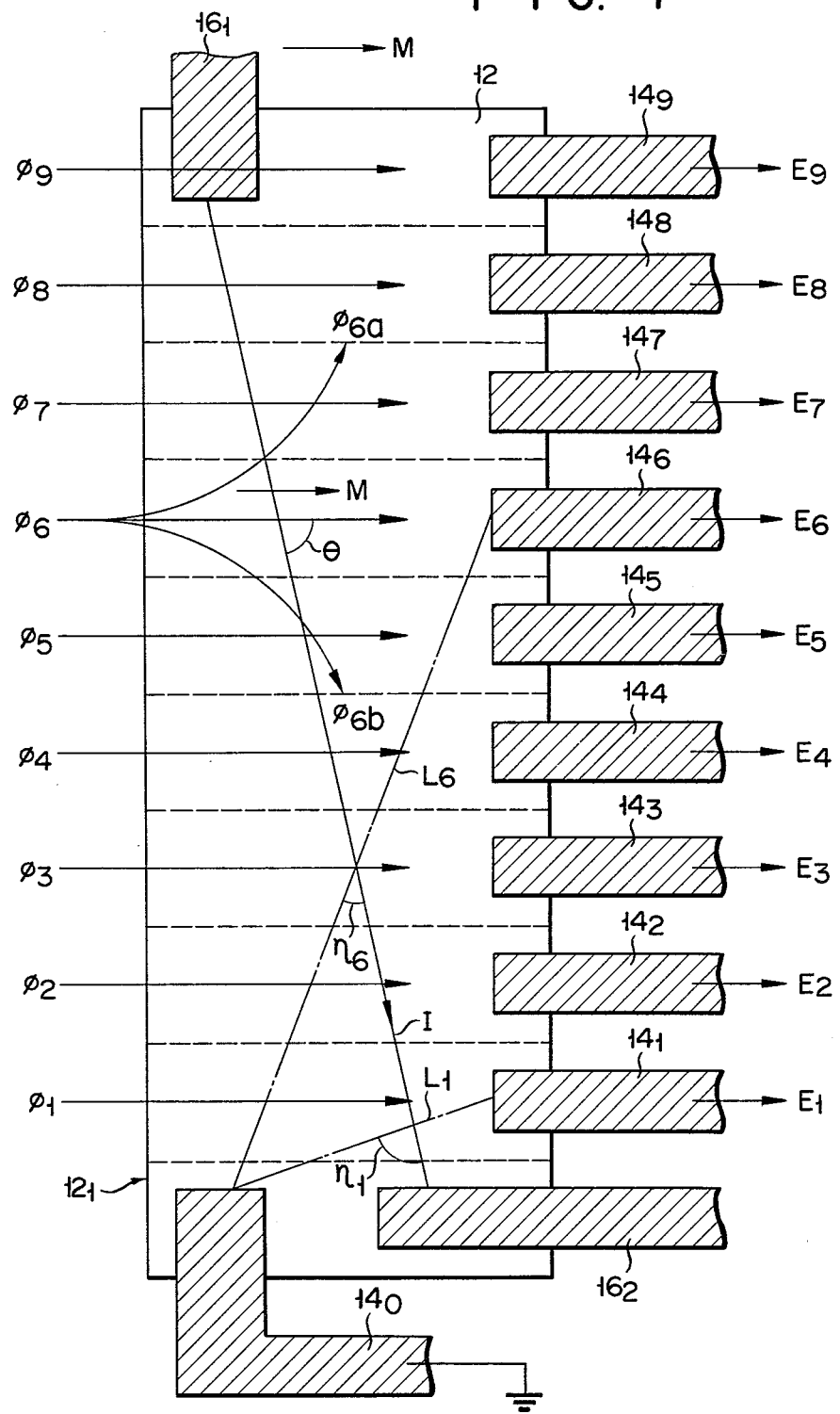
FIG. 7 is an enlarged plan view of the amorphous magnetic film 12 of FIG. 6.

FIG. 7 is a plan view of the film 12 of FIG. 6. Set on the side of the lateral edge $12_1$ of the film 12 is a magnetic tape (not shown) in which signals for the nine channels are recorded. Magnetic fluxes $\phi_1$ to $\phi_9$ sent forth from the first to the ninth tracks of the magnetic tape are supplied to the corresponding channels. Said magnetic fluxes $100_1$ to $\phi_9$ run to the film 12 along its axis of easy magnetization. Then, the voltage terminal patterns $14_1$ to $14_9$ are supplied with Hall voltage signals $E_1$ to $E_9$ corresponding to the magnetic fluxes $\phi_1$ to $\phi_9$. In the case of such multichannel magnetic head, it is difficult that the bias current I defines an angle $\theta$ of 45° with the axis of each magnetization M of the film 12. While, however, the angle $\theta$ falls within the range of $0<\theta<\pi/2$, it is possible to produce Hall voltage signals $E_1$ to $E_9$.

Description is now given of interchannel crosstalk. Referring to FIG. 7 a magnetic flux $\phi_{6a}$ denotes a leakage running from the 6th to the 7th channels. A magnetic flux $\phi_{6b}$ shows a leakage passing from the 6th to the 5th channels. The film 12 indicates a prominent anomalous Hall effect along the axis of easy magnetization M. Magnetic fluxes conducted not in parallel with the axis of easy magnetization M generate very low Hall voltage. For instance, the magnetic flux $\phi_{6a}$ impresses a considerably lower voltage on the voltage terminal pattern $14_7$ than the magnetic flux $100_7$. Similarly, the magnetic flux $100_{6b}$ impresses a far lower voltage on the voltage terminal pattern $14_5$ than the magnetic flux $\phi_5$. Therefore, crosstalk imparted by the magnetic flux $\phi_6$ of the 6th channel to the adjacent 5th and 7th channels can be fully reduced. This favorable effect is realized, because the film 12 has planar magnetic anisotropy and the main streams of the magnetic fluxes of the respective channels run into the film 12 in the direction of said planar magnetic anisotropy. The smaller an interval between the main streams of the adjacent magnetic fluxes (for example, $\phi_6$ and $\phi_7$), the more noticeable the interchannel crosstalk. When the crosstalk raises practical problems, then it is advised to electrically cancel the crosstalk as later described.

Figure 7A:
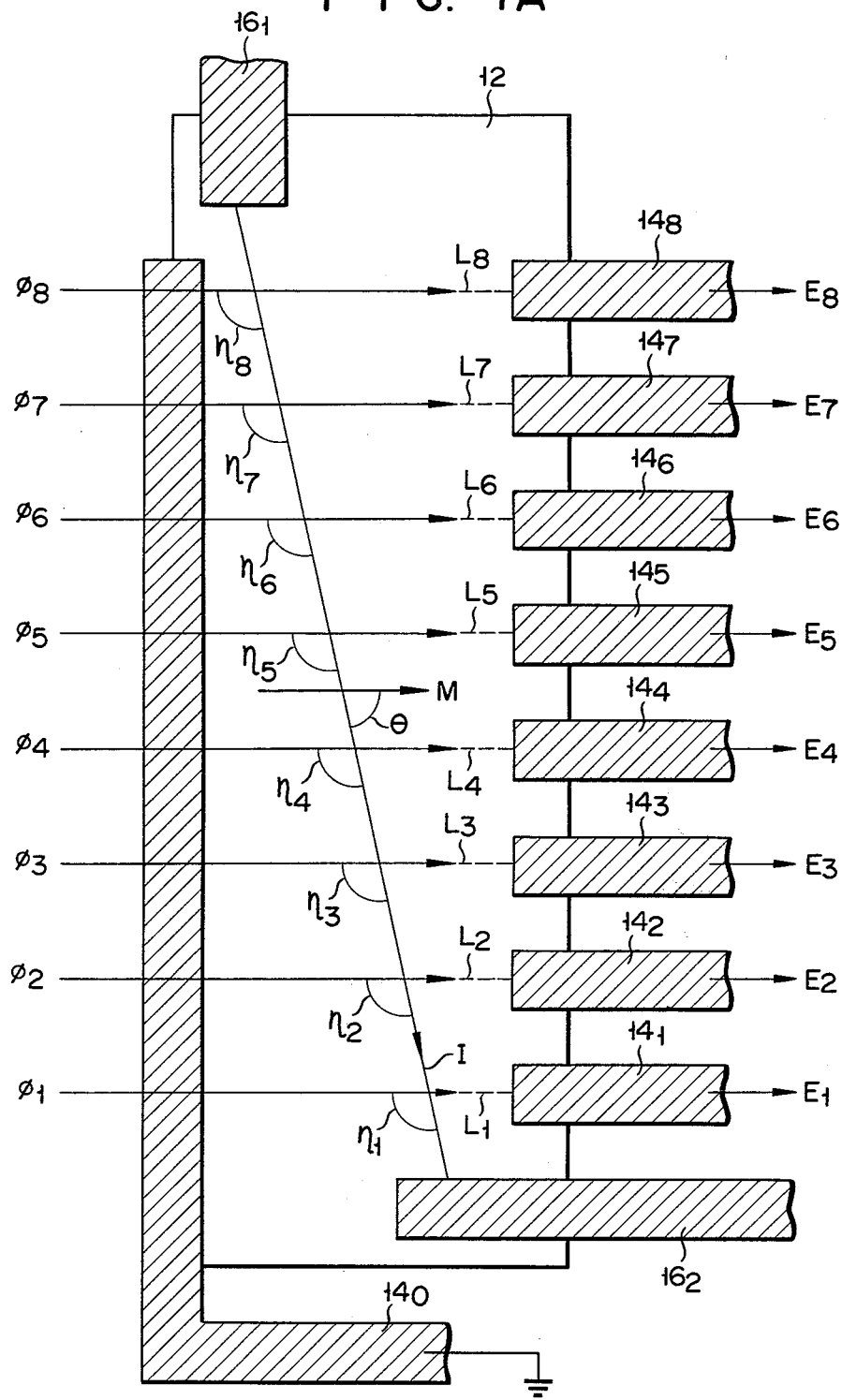
FIGS. 7A and 7B are modifications of the amorphous magnetic film of FIG. 7.
Figure 7B:
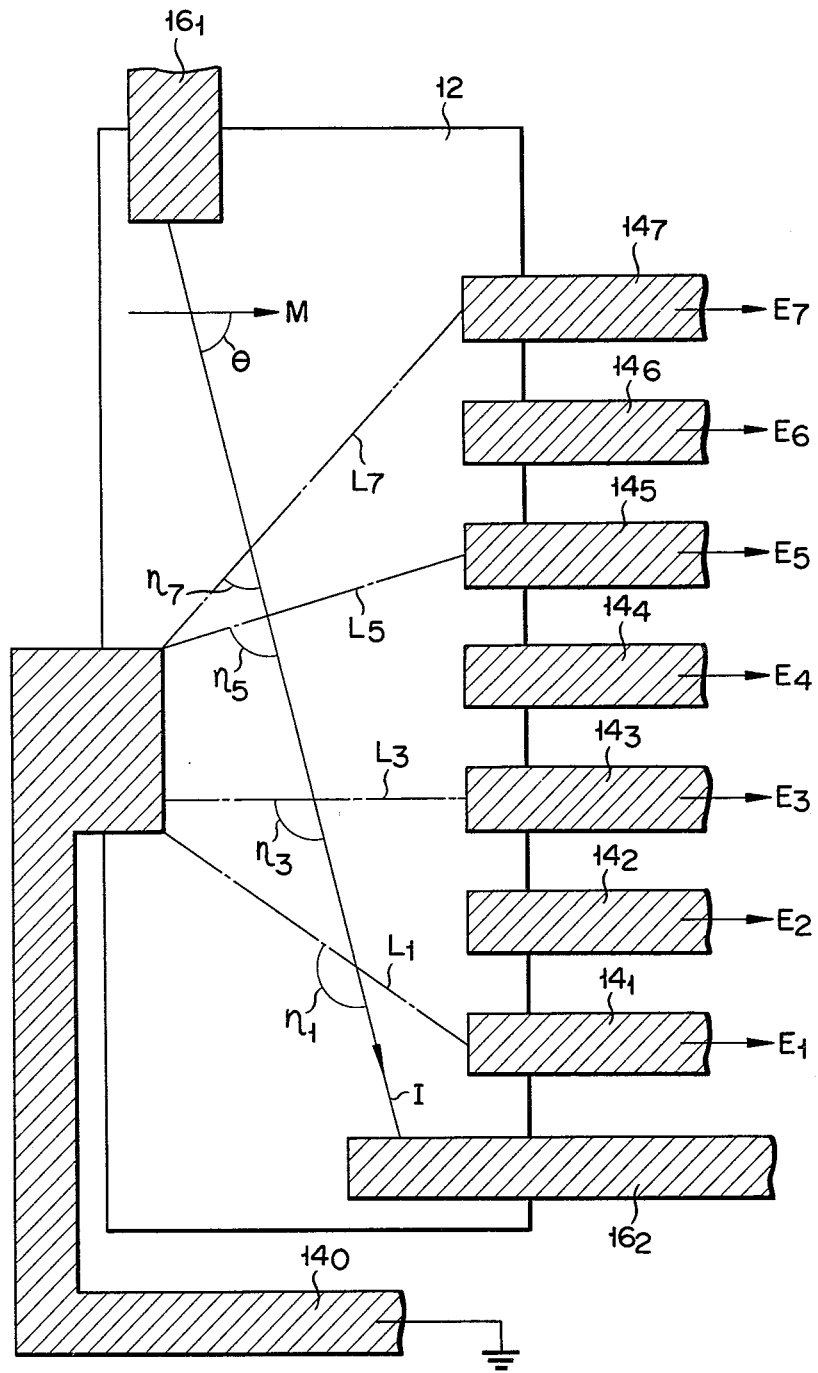

FIGS. 7A and 7B are modifications of FIG. 7. In FIG. 7A, the common voltage terminal pattern $14_0$ is made to face all the voltage terminal patterns $14_1$ to $14_8$. This arrangement causes the shortest lines L1 to L8 connecting the common voltage terminal pattern $14_0$ to the other voltage terminal patterns $14_1$ to $14_8$ to be rendered parallel with ech other. Consequently, the angles $\eta 1$ to $\eta 8$ defined by the running direction of the bias current I with the connection lines $L_1$ to $L_8$ are made substantially equal. Therefore, the arrangement of FIG. 7A enables all the channels to have the same sensitivity ($dE/d\phi$). In contrast, the arragement of FIG. 7 causes the first channel to have the highest sensitivity ($dE_1/d\phi_1 > dE_9/d\phi_9$).

FIG. 7B represents the case where the angle $\eta$ ranges between over 90° and below 90°. The arrangement of FIG. 7B causes the center channels (third and fourth channels) to have the highest sensitivity, and the lower channels (first and second channels) and the upper channels (fifth, sixth and senventh channels) to have a low sensitivity. The arrangements of FIGS. 7 and 7B are applicable to the case where it is desired to change the sensitivity of the Hall elements of the respective channels.

It is practically preferred for the arrangements of FIGS. 7, 7A and 7B that the angle $\theta$ be set at $45\pm30°$, and the angle $\eta$ be set at $90\pm60°$. The highest sensitivity is assured when the angle $\theta$ stands at 45° and the angle $\eta$ indicates 90°.

FIG. 8 shows a circuit for electrically eliminating interchannel crosstalk arising in the magnetic head of FIGS. 7, 7A or 7B. A Hall voltage signal $E_1$ detected by the voltage terminal pattern $14_1$ corresponding to the first channel of the film 12 is amplified by a first amplifier (not shown). An output voltage signal $E_{01}$ from the first amplifier is supplied to the noninverted input terminal of a mixer $50_1$ and also to the inverted input terminal of a mixer $50_2$ through an attenuator $52_1$ having an attenuation ratio $K_1$. An output voltage signal $E_{02}$ corresponding to a Hall voltage signal $E_2$ is conducted to the noninverted input terminal of the mixer $50_2$ and also to the inverted input terminals of the mixers $50_1$, $50_3$ through the corresponding attenuators $52_2$, $52_3$. The same description as given above applies to an output voltage signal $E_{03}$ and others.

Now let is be assumed that the output voltage $E_{02}$ from the second channel is expressed by the following equation:

$$E_{02} = \overline{E_{02}} + K_1 E_{01} + K_4 E_{03} \quad (1)$$

where:
$\overline{E_{02}}$ = a pure signal component of the second channel free from a crosstalk component
$E_1 K_{01}$ = crosstalk component leaking from the first channel to the second channel
$K_4 E_{03}$ = crosstalk component leaking from the third channel to the second channel
Where, with the mixer $50_2$, the terms $K_1 E_{01}$ and $K_4 E_{03}$ are subtracted from the above equation (1), then a component of the second channel signal $E_{02}$ delivered from the mixer $50_2$ is expressed only by $\overline{E_{02}}$. Elimination or cancellation of a crosstalk component from the second channel signal $E_{02}$ is effected by controlling the attenuation ratios $K_1$, $K_4$ of the attenuators $52_1$, $52_4$. When a constnt phase difference is present between the output voltage signals $E_{01}$ to $E_{03}$, then it is preferred to connect a phase-variable phase shifter in series with the attenuator 52. The reason is that where the output voltage signals $E_{01}$ to $E_{03}$ indicate a large phase difference, then crosstalk components can not be eliminated from the signal $E_{02}$, no matter how the attenuation ratio of the attenuator 52 may be controlled.

It will be noted that a magnetic head embodying this invention which is described with reference to the accompanying drawings does not limit the invention in any way. Obviously, the invention can be practised in various modifications without changing the scope and object of the invention. For instance, the substrate 10 and second magnetic head half 20 may be formed of not only insulating material, but also conductive metal, for example, brass. When the substrate 10 is prepared from brass, then it is necessary to mount an insulation layer 60 made of, for example, $SiO_2$ on the upper surface $10_1$ of the substrate 10 in order to prevent the patterns 14, 16 and film 12 from electrically short-circuited. Provision of the insulation layer 60 broadens the width L26 of the junction 26. With the magnetic head of this invention, however, the effective gap width is defined by the thickness L12 of the film 12, not by said junction width L26. When the substrate 10 and second magnetic head half 20 are made of conductive material, then electrostatic shielding of the film 12 can be effected by connecting said substrate 10 and second magnetic head half 20 to a ground circuit.

Figure 9:
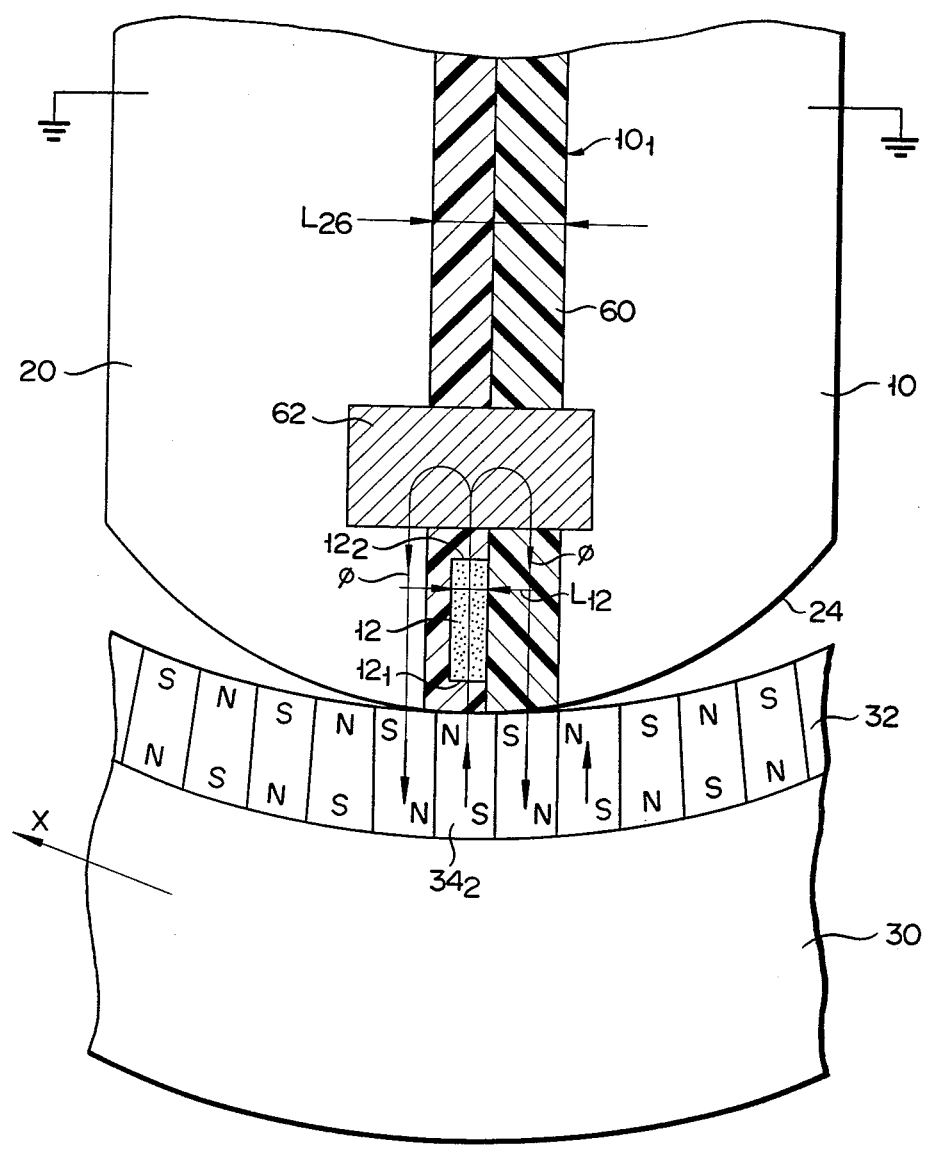
FIG. 9 indicates a modification of FIG. 4.

Referring to FIG. 4 or 9, it is possible to mount a ferromagnetic member 62 shown in FIG. 9 (but not indicated in FIG. 4) along the lateral edge $12_2$ opposite to the aforementioned lateral edge $12_1$ of the film 12. In this case, a magnetic flux $\phi$ issued from the unit magnetized region $34_2$ is attracted by the ferromagnetic member 62, thereby increasing the magnitude of the magnetic flux $\phi$ conducted along the axis of easy magnetization of the film 12. In other words, the ferromagnetic member 62 reduces the magnetic reluctance of a magnetic circuit of the magnetic flux $\phi$ passing along the axis of easy magnetization of the film 12.

Last it may be added that the film 12 possessed of planar magnetic anisotropy which constitutes the main component of a magnetic head embodying this invention is also applicable to a magnetic head set forth in the Japanese patent application Ser. No. 54-91,377 (corresponding to patent application, Ser. No. 168,281, filed in the United States on July 10, 1980) filed by the same assignee as that of the present patent application. The MR element 14 disclosed in the Japanese patent application Ser. No. 54-91,377 may be replaced by the amorphous magnetic film 12 claimed in the present invention.

What is claimed is:
1. A magnetic head which comprises:
a support member having a plane to be faced by a magnetic recording medium; and
an amorphous magnetic film which has an axis of easy magnetization along the plane thereof and being arranged on said support member such that a magnetic flux ($\phi$) sent forth from said magnetic recording medium passes through said amorphous magnetic film along said axis of easy magnetization, said amorphous magnetic film being so biased by a bias current that a first angle (θ) defined by the direction of said axis of easy magnetization and the running direction of said bias current is larger than 0° and smaller than 90°.

2. A magnetic head which comprises:
a support member having a plane to be faced by a magnetic recording medium;
an amorphous magnetic film which has an axis of easy magnetization along the plane thereof and being arranged on said support member such that magnetic fluxes sent forth from said magnetic recording medium pass through said amorphous magnetic film along said axis of easy magnetization;
a pair of current terminals for conducting a bias current onto said amorphous magnetic film; and
a plurality of voltage terminals for providing a plurality of Hall voltages corresponding to said magnetic fluxes emitted from said recording medium;
sid current terminals being so positioned that a first angle (θ) defined by the direction of said axis of easy magnetization and the running direction of said bias current is larger than 0° and smaller than 90°.

3. A magnetic head which comprises:
a first nonmagnetic member comprising a front plane to be brought into contact with a magnetic recording medium;
an amorphous magnetic film which has an axis of easy magnetization along the plane thereof and being arranged in such a prescribed position on said first member that magnetic fluxes issued from said magnetic mediuml pass through said amorphous magnetic film along said axis of easy magnetization;
a second nonmagnetic member arranged in a prescribed position on said first member to clamp said amorphous magnetic film with the aid of said first member, a transducing gap for detecting the magnetic fluxes being made to face the junction of said first and second nonmagnetic members;
a pair of current terminals for conducting a bias current onto said amorphous magnetic film; and
a plurality of voltage terminals for providing a plurality of Hall voltages corresponding to said magnetic fluxes emitted from said recording medium;
said current terminals being so positioned that a first angle (θ) defined by the direction of said axis of easy magnetization and the running direction of said bias current is larger than 0° and smaller than 90°.

4. The magnetic head of claim 1 or 2, further comprising a ferromagnetic material occupying a prescribed position on said support member such that said amorphous magnetic film is disposed between said ferromagnetic material and the plane facing said recording medium.

5. The magnetic head of claim 2, wherein said voltage terminals are so disposed that a second angle defined by the running direction of said bias current and a line connecting a given pair of voltage terminals selected from among said voltage terminals is larger than 0° and smaller than 180°.

6. The magnetic head of claim 3, wherein said voltage terminals are so disposed that a second angle defined by the running direction of said bias current and a line connecting a given pair of voltage terminals selected from among said voltge terminals is larger than 0° and smaller than 180°.

7. The magnetic head of claim 2, wherein said first angle (θ) is about 45±30°.

8. The magnetic head of claim 3, wherein said first angle (θ) is about 45±30°.

9. The magnetic head of claim 5, wherein said second angle is about 90±60°.

10. The magnetic head of clim 6, wherein said second angle is about 90±60°.

11. The magnetic head of any one of claims 1, 2 or 3, wherein said amorphous magnetic film is an alloy containing a rare earth element and transition metal element.

12. The magnetic head of claim 11, wherein said rare earth element is gadolinium and the content of gadolinium in said alloy accounts for about 15 to about 40 atomic percent.

13. The magnetic head of claim 11, wherein said transition metal is an element of the iron group.

14. The magnetic head of any one of claims 1, 2 or 3, wherein said amorphous magnetic film has a thickness less than about 0.2 micron.

15. A method for manufacturing a magnetic head which comprises the steps of:
(a) forming an amorphous magnetic film containing a rare earth element and transition metal element on a prescribed plane of a first insulation block, said amorphous magnetic film having an axis of easy magnetization along the plane thereof;
(b) forming bias current conductors and signal conductors on the surface of said amorphous magnetic film and the prescribed plane of said first insulation block, so that an angle (θ) formed between a line connecting said bias current conductors and a line connecting a given pair of signal conductors selected from said signal conductors is larger than 0° and smaller than 90°;
(c) fitting a second insulation block on the prescribed plane of said first insulation block to hold said amorphous magnetic film between said first and second insulation blocks; and then
(d) grinding said first and second insulation blocks on one side so that the ground plane is positioned substantially perpendicular to the axis of easy magnetization of said amorphous magnetic film.

16. The method of claim 15, wherein said amorphous magnetic film is deposited by sputter.

17. The method of claim 15, wherein said amorphous magnetic film is formed by vacuum thermal deposition, by electron beam heating.

18. The method of claim 15, comprising forming said amorphous magnetic film while rotating said first insulation block.

19. The method of any one of claims 16, 17 or 18, wherein said amorphous magnetic film is formed by depositing its raw material in a specified direction on the prescribed plane of said first insulation block, and the specified direction and a normal of said prescribed plane being at a prescribed acute angle.

20. The method of claim 19, wherein the prescribed angle is about 60°.

21. A magnetic head manufactured by the method of any one of claims 15, 16, 17 or 18.

22. A magnetic head manufactured by the method of claim 19.

* * * * *